United States Patent
Chen et al.

(10) Patent No.: US 10,664,278 B2
(45) Date of Patent: May 26, 2020

(54) METHOD AND APPARATUS FOR HARDWARE ACCELERATION IN HETEROGENEOUS DISTRIBUTED COMPUTING

(71) Applicant: Huawei Technologies Co., Ltd., Shenzhen (CN)

(72) Inventors: Yuanxi Chen, Newmarket (CA); Jack Hon Wai Ng, Richmond Hill (CA); Craig Davies, Port Perry (CA); Reza Azimi, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 15/680,179

(22) Filed: Aug. 17, 2017

(65) Prior Publication Data

US 2019/0056942 A1 Feb. 21, 2019

(51) Int. Cl.
*G06F 9/38* (2018.01)
*G06F 9/50* (2006.01)
*G06F 9/4401* (2018.01)
*G06F 15/82* (2006.01)

(52) U.S. Cl.
CPC .............. *G06F 9/38* (2013.01); *G06F 9/4405* (2013.01); *G06F 9/5011* (2013.01); *G06F 9/5044* (2013.01); *G06F 15/82* (2013.01)

(58) Field of Classification Search
CPC ....................................................... G06F 9/38
See application file for complete search history.

(56) References Cited

U.S. PATENT DOCUMENTS

| | | | |
|---|---|---|---|
| 2011/0040947 A1 | 2/2011 | Kohlenz et al. | |
| 2012/0023554 A1 | 1/2012 | Murgia et al. | |
| 2015/0007182 A1* | 1/2015 | Rossbach | G06F 9/4843 718/102 |
| 2015/0052331 A1 | 2/2015 | Dhurjati et al. | |
| 2015/0169382 A1* | 6/2015 | Anderson | G06F 9/5094 718/104 |
| 2015/0264134 A1 | 9/2015 | Dong et al. | |

* cited by examiner

*Primary Examiner* — Sisley N Kim
(74) *Attorney, Agent, or Firm* — Slater Matsil, LLP

(57) ABSTRACT

In a distributed computing system comprising multiple processor types, a method of provisioning includes receiving a request from a client device for execution of a function. A first data structure identifies implementations of the function and compatible processor types for each implementation. A second data structure identifies available processors in the system. Compatible processor types matching available processors are candidates for execution of the function. A provisioning instruction is created for allocating resources for execution of the function.

17 Claims, 10 Drawing Sheets

| ResourceID | accelProfileID | performance | TDP | devStatus | availability |
|---|---|---|---|---|---|
| 000001 | 002 | 4 | 30 | stable | 1 |
| 000002 | 001 | 2 | 25 | stable | 0 |
| 000003 | 003 | 3 | 60 | experimental | 1 |
| 000004 | 101 | 1 | 250 | stable | 1 |
| 000005 | 001 | 2 | 30 | stable | 1 |
| 000006 | 004 | 6 | 100 | stable | 0 |
| ... | | | | | |

FIG. 6

```
func_accel_policy_version: 0.1 description: >
     A sample function acceleration policy file.
---
acc_fn1:                                            ─182
     function_category: compression                 ─184
     function_type: [gzip, snappy]
     ranking:   #ordering as defined by list
         order
     200-1 ⎰ -type: perf                            ─200
           ⎱ order: DESC       #descending order
     200-2 ⎰ -type: tdp
           ⎱ order: ASC        #ascending order
     200-3 ⎰ -type: function_type
           ⎱ order: ASC
     perf_metric: bandwidth                         ─186
     perf_unit: Gbps                                ─188
     min_perf: 1
     max_tdp: 50 W
     min_status: stable      #minimum acceptable IP status
     requirement: hard       #must use hw acceleration
---
```

|   | Function Type | Function Name | Perf. (GBps) | TDP (W) | Status | Accel. Profile |
|---|---|---|---|---|---|---|
| 204-1 | gzip | my-gzip | 2 | 30 | Stable | A |
| 204-2 | gzip | fast-gzip | 3 | 60 | Experimental | B |
| 204-3 | gzip | my-gzip2 | 2 | 25 | Stable | A |
| 204-4 | gzip | slow-gzip | 1 | 50 | Stable | C |
| 204-5 | snappy | fast-snappy | 6 | 100 | Stable | D |
| 204-6 | snappy | slow-snappy | 3 | 40 | Stable | E |

FIG. 9A

|   | Function Type | Function Name | Perf. (GBps) | TDP (W) | Status | Accel. Profile |
|---|---|---|---|---|---|---|
| 204-6 | snappy | slow-snappy | 3 | 40 | Stable | E |
| 204-3 | gzip | my-gzip2 | 2 | 25 | Stable | A |
| 204-1 | gzip | my-gzip | 2 | 30 | Stable | A |
| 204-4 | gzip | slow-gzip | 1 | 50 | Stable | C |

FIG. 9B

METHOD AND APPARATUS FOR HARDWARE ACCELERATION IN HETEROGENEOUS DISTRIBUTED COMPUTING

FIELD

This relates to distributed computing, and in particular, to methods and systems for utilizing hardware acceleration in heterogenous distributed computing systems.

BACKGROUND

In distributed computing systems, computing resources are shared between multiple sources of computing workloads. For example, resources may be shared between multiple users, groups, applications and workstations.

Distributed computing allows large computational resources to be pooled and allocated to tasks as needed, rather than being permanently associated with a single server or workstation. Accordingly, resources can be provided for any given workload at a relatively low cost.

Distributed computing systems may need to perform a diverse set of workloads and may include a diverse set of computing resources. For example, computing resources may include general-purpose processors, such as x86 processors; graphics processors (GPUs); field-programmable gate arrays (FPGAs); and embedded processors (DSPs).

General purpose processors are relatively flexible. However, more specialized types of processors, such as may be suited to perform certain types of workloads more efficiently.

Typically, applications are developed or packaged for a specific platform. That is, applications are bound to a particular type of processor, using resources such as APIs, libraries and binaries for that type of processor. Unfortunately, such an approach does not exploit the flexibility of distributed computing systems with heterogenous processing resources.

SUMMARY

An example method of provisioning resources in a distributed computing system comprising multiple processor types comprises, at a server: receiving a request from a client device for execution of a function; retrieving a first data structure relating implementations of the function and compatible processor types for each of the implementations and a second data structure identifying available processors in the computing system, wherein each compatible processor type that matches at least one of the available processors is a candidate processor type; transmitting a provisioning instruction for allocating a processor, from the available processors, of a selected one of the candidate processor types for execution of the function.

In some embodiments, the method comprises receiving at least one execution parameter defining preferences for hardware acceleration; and ranking the candidate processor types based on the at least one execution parameter and selecting one of the candidate processor types based on the ranking.

In some embodiments, the ranking comprises filtering the candidate processor types based on the at least one execution parameter.

In some embodiments, the ranking comprises assigning weights to the candidate processor types.

In some embodiments, the method comprises: receiving a provisioning failure notification; revising the ranking by changing the weights; and transmitting a provisioning instruction for allocating another selected one of the candidate processor types for execution of the function, wherein the another selected one of the candidate processor types is selected from the revised ranking.

In some embodiments, the method comprises, in response to the receiving a provisioning failure notification, retrieving at least one data structure to update the candidate processor types.

In some embodiments, the method comprises, in response to receiving a provisioning failure notification, generating a provisioning instruction for allocating a general-purpose processor for execution of the function.

In some embodiments, the processor types include a field-programmable gate array and a general purpose processor.

In some embodiments, the implementations of the function comprise hardware-accelerated implementations compatible with the processor types.

In some embodiments, the implementations further comprise software implementations for execution on the general-purpose processor.

Example methods may include combinations of the above features.

An example server for a distributed computing system comprising multiple types of processors, the server comprising: a catalog module configured to maintain a first data structure relating function implementations and compatible processor types for the function implementations; a resource management module configured to provide a second data structure identifying available processors in the distributed computing system; a resource orchestrator module configured to: receive a request from a client device for execution of a function; retrieve, from the first data structure the compatible processor types for implementations of the function; match the available processors to the retrieved compatible processor types to define candidate processor types; the server configured to generate a provisioning instruction for allocating a processor, from the available processors, of a selected one of the candidate processor types for execution of the function.

In some embodiments, the resource orchestrator module is configured to filter the candidate processors based on the at least one execution parameter.

In some embodiments, the resource orchestrator module is configured to rank the candidate processors by assigning weights to the candidate types of processors.

In some embodiments, the resource orchestrator module is configured to adjust the weights in response to failure of a provisioning attempt.

In some embodiments, the server is configured to generate a provisioning instruction for allocating a general-purpose processor for execution of the function in response to failure of a provisioning attempt.

In some embodiments, the candidate types of processors include a field-programmable gate array and a general purpose processor.

In some embodiments, the function implementations comprise hardware-accelerated implementations compatible with the processor types.

In some embodiments, the function implementations further comprise software implementations for execution on general-purpose processors.

Example servers may include combinations of the above features.

An example distributed computing system comprises: a plurality of resource servers having processors of a plurality of types; a master server in communication with the resource servers, the master server comprising: a catalog module configured to maintain a first data structure identifying function implementations in the computing system and compatible processor types for the function implementations; a resource management module configured to provide a second data structure identifying available processors in the distributed computing system; a resource orchestrator module configured to: receive a request from a client device for execution of a function and a least one execution parameter defining preferences for hardware acceleration; retrieve, from the first data structure the compatible processor types for implementations of the function; match the available processors to the retrieved compatible processor types to define candidate processors; rank the candidate processors based on the at least one execution parameter; the master server configured to generate a provisioning instruction for allocating a processor, from the available processors, of a selected one of the candidate processor types for execution of the function.

In some embodiments, the resource orchestrator module is configured to: receive at least one execution parameter defining preferences for hardware acceleration; rank the candidate processor types and select one of the candidate processor types based on the ranking.

In some embodiments, the plurality of types includes field-programmable gate arrays and general-purpose processors.

In some embodiments, the system further comprises a plurality of resource servers hosting the processors of different types, each the resource server having a program interface configured to receive generic function calls from application software and a binding service to replace the generic function calls with commands for execution on a processor hosted at that resource server.

Example systems may include combinations of the above features.

BRIEF DESCRIPTION OF DRAWINGS

In the figures, which depict example embodiments:

FIG. 6 is a schematic diagram of an example data structure representing resources available within the system of FIG. 1;

FIG. 7 is a code excerpt showing an example accelerator policy for a hardware-accelerated function;

FIGS. 9A-9B are charts of candidate resources prior to and after filtering and ranking, respectively.

DETAILED DESCRIPTION

Figure 1:
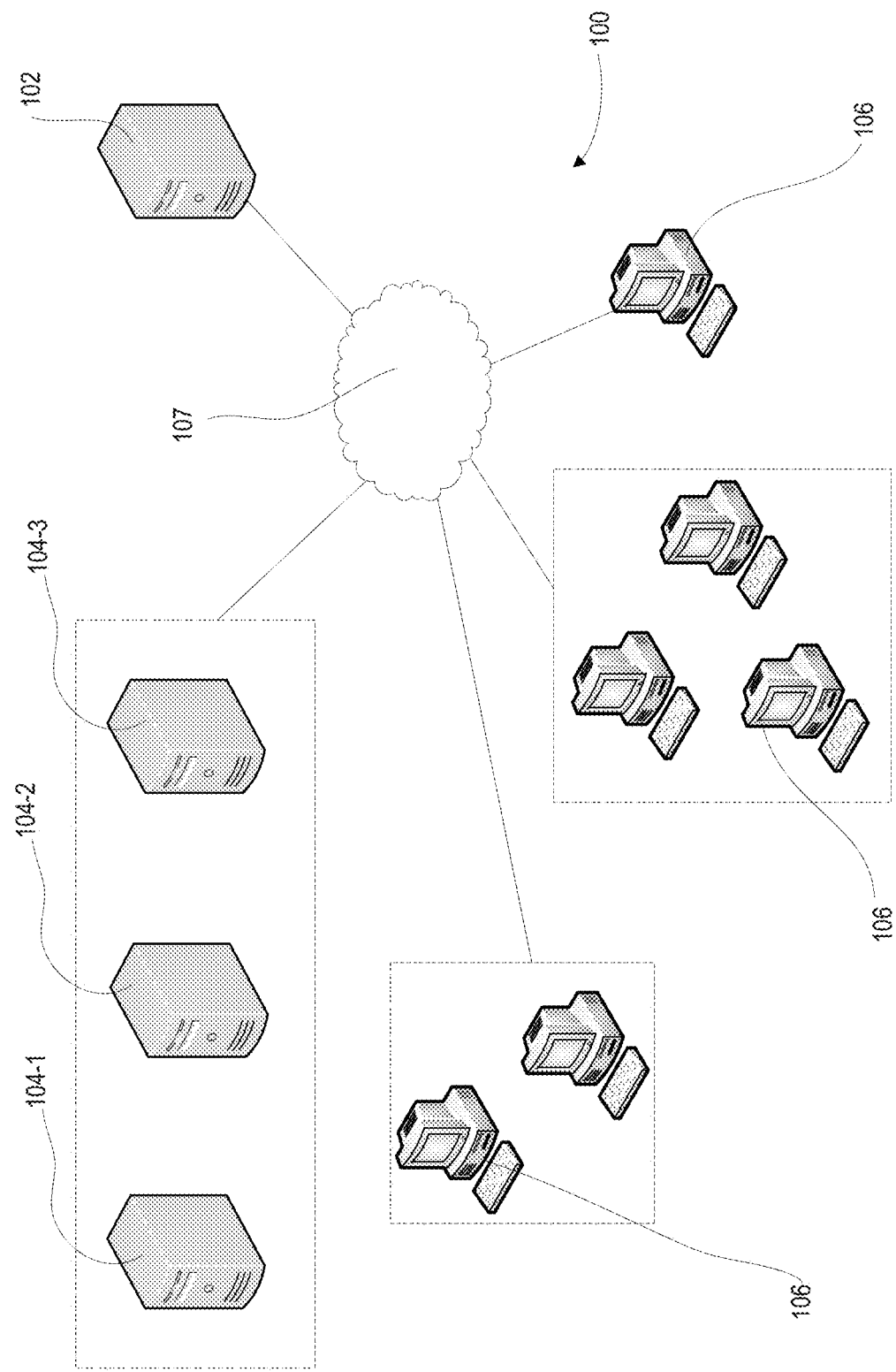
FIG. 1 is a schematic diagram of a distributed computing system.

FIG. 1 illustrates aspects of an example computing system 100 to which aspects of the present disclosure can be applied.

Computing system 100 is a distributed computing system. Computing system 100 makes use of computing resources that may be distributed across a number of locations to provide a common pool of computing and storage resources to be shared amongst users and groups of users. Computing system 100 can include any combination of hardware and software components. For example, computing system 100 includes a combination of components such as computing devices, processors, networks, memories, storage devices, network devices, power sources, license servers (e.g., software license servers), swap space, and the like. Computing system 100 is a heterogeneous environment. That is, computing system 100 includes resources, such as processors, of different types.

The computing system 100 includes a master server 102 and resource servers 104-1, 104-2, 104-3 (individually and collectively, resource servers 104). Although three resource servers 104 are shown in FIG. 1, any number of resource servers may be present. The computing environment further includes one or more client computing devices 106. Client computing devices 106 may be, for example, PCs, tablet computers, smartphones, or the like, making use of operating systems such as Microsoft Windows, Apple OS X or iOS, Android OS, Linux, or other suitable operating systems.

As will be described in further detail, computing resources provided by resource servers 104 are shared among client computing devices 106. Client computing devices 106 can request resources for execution of workloads and master server 102 allocates resources for execution of such workloads.

As depicted, master server 102, resource servers 104 and client computing devices 106 are interconnected via one or more networks 107, such as IPv4, IPv6, X.25, IPX compliant or similar networks, including one or more wired or wireless access points. The networks may include one or more local-area networks (LANs) or wide-area networks (WANs), such as the internet. In some embodiments, the networks are connected with other communications networks including mobile communication networks such as GSM/GPRS/3G/4G/LTE networks as well as Fifth Generation (5G) wireless networks.

Figure 2:
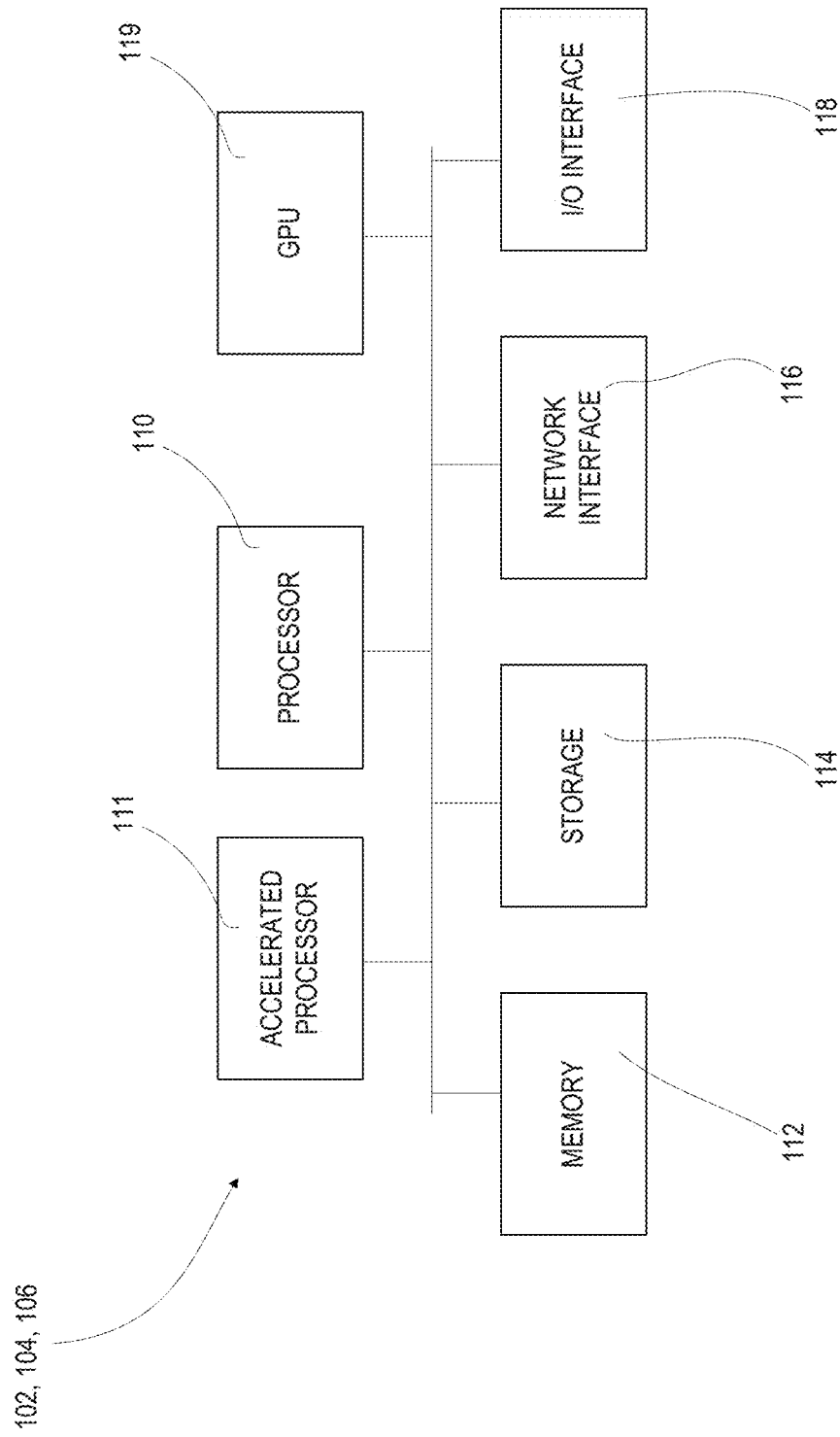
FIG. 2 is a block diagram of components of a computing device.

FIG. 2 is a block diagram of components of an example of any one of master server 102, resource server 104 and client 106. As depicted, each resource server 104 includes one or more processors 110, memories 112, persistent or non-transient storage 114, network interfaces 116 and input/output interfaces 118. Resource server 104 may further include one or more graphics processing units 119. Resource server 104 may include one or more accelerated processors 111 instead of or in addition to processor 110. An accelerated processor 111 may be an application-specific processor (ASIC), a field programmable gate array (FPGA), Digital Signal Processor (DSP) or another type of processor that provides hardware acceleration for a specialized set of functions or function types, referred to hereinafter as accelerated processors.

Processor 110 may be any type of general-purpose processor, such as an Intel or AMD x86 or x64, PowerPC, ARM processor, or the like. As will be apparent, general-purpose processors are relatively flexible, in that they can perform a broad range of computing tasks, under control of appropriate software. Accelerated processors, on the other hand, are capable of a narrower set of functions than a general-purpose processor, but are configured for very fast or efficient performance of certain types of computing tasks. In some embodiments, an accelerated processor is physically designed to provide efficient performance on a specific set of computing operations. As described herein, graphics processing units 119 can function as accelerated processors. That is, GPUs 119 can be configured for rapid execution of certain types of calculations including those related to image rendering and physics. In the context of distributed computing system 100, GPUs 119 can be used to execute computing workloads with mathematical functions similar to rendering and physics calculations.

In the embodiment of FIG. 1, resource server 104-1 is a general-purpose computer, with a general purpose x86 processor 110 and a GPU 119. Resource server 104-2 has an accelerated processor 111, namely an FPGA, possibly in addition to other processors. Resource server 104-2 has another type of accelerated processor 111, namely, an ASIC, again possibly in addition to other processors.

With reference back to FIG. 2, network interface 116 connects master server 102, resource server 104 or client computing device 106 to networks 107. I/O interface 118 is an optional component that can further connect master server 102, resource server 104 or client computing device 106 to one or more peripherals such as keyboards, mice, USB devices, disc drives, and the like.

In the depicted embodiment, each one of master servers 102, resource servers 104 and client computing devices 106 is a separate physical device. In other embodiments, one or more of master servers 102, resource servers 104 and client computing devices 106 and components thereof are virtualized, that is, one or more of master servers 102, resource servers 104 and client computing devices 106 are virtual devices residing in software at another computing device. Virtualized machines are accessible by other ones of master servers 102, resource servers 104 and client computing devices for example by way of network 107. In other embodiments, a cluster of computing devices can be connected together, and each device in the cluster can serve more than one purpose. One of the devices may serve the role of the master device, and all devices may serve as both resource servers and client computing devices.

Figure 3:
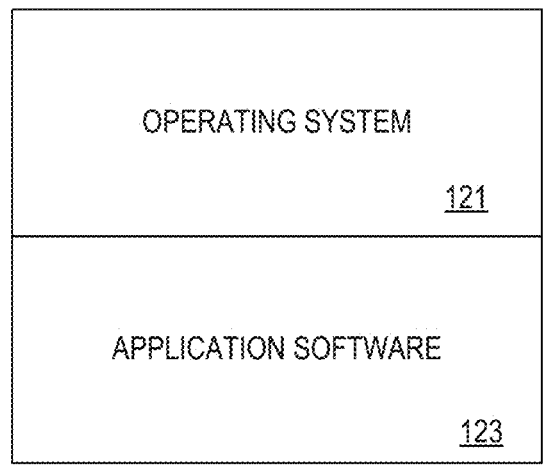
FIG. 3 is a block diagram of software at a client computing device of the system of FIG. 1.

FIG. 3 depicts software components present at a client computing device 106. Client computing device has operating system software 121 and application software 123. Application software 123 communicates with operating system software 121 and with hardware by way of components such as drivers and application programming interfaces (APIs). That is, application software 123 creates processing requests and other requests for resources by calls to drivers and to APIs supported by the operating system 121.

Some drivers and APIs at client computing device 106 are configured to direct processing tasks, e.g. requests for deployment of functions or applications to master server 102 for execution using resources within distributed computing system 100. As noted, distributed computing system 100 includes heterogenous resources. For example, distributed computing system 100 may provide general purpose processors capable of executing software implementations of advanced functions. Distributed computing system 100 may further provide specialized processors, referred to as accelerators, providing hardware-accelerated implementation of functions.

Typically, all of the operating system 121, application software 123 and the drivers and APIs are customized for the hardware upon which they are executed. For example, some software relied upon by the respective components is compiled to run on a specific type of processor 110, accelerated processor 111 or GPU 119. Likewise, operating system software 121 and application software 123 may be specifically configured to call functions from such binaries. That is, a binary configured to interface with an FPGA may differ from a binary configured to interface with a general purpose processor such as an x86 processor. Likewise, the associated application software 123 and API calls may be customized based on such differences. Thus, software developers typically need to decide upon the environment in which applications will be executed, and applications are typically deployed for execution on a particular platform. Furthermore, it should be understood that some functions may have compiled versions for some processor types but not others. For example a particular function may be available compiled for a general purpose processor and for a GPU, but not for a particular type of FPGA.

Execution of functions using appropriate accelerators generally provides improved efficiency or performance. However, such accelerators are typically highly specialized and may only efficiently perform a small set of functions. On the other hand, general-purpose processors are capable of executing any arbitrary computing task, albeit at reduced performance relative to an accelerated processor. Computing system 100 can support deployment of application software 123 that is capable of execution upon multiple types of processing resources within computing system 100, and to permit flexible provisioning of resources so that application workloads can take advantage of the performance offered by one or more appropriate accelerators when available, and the flexibility of general-purpose processors when acceleration is not available or the use of an accelerated processor is not sufficiently advantageous.

Figure 4:
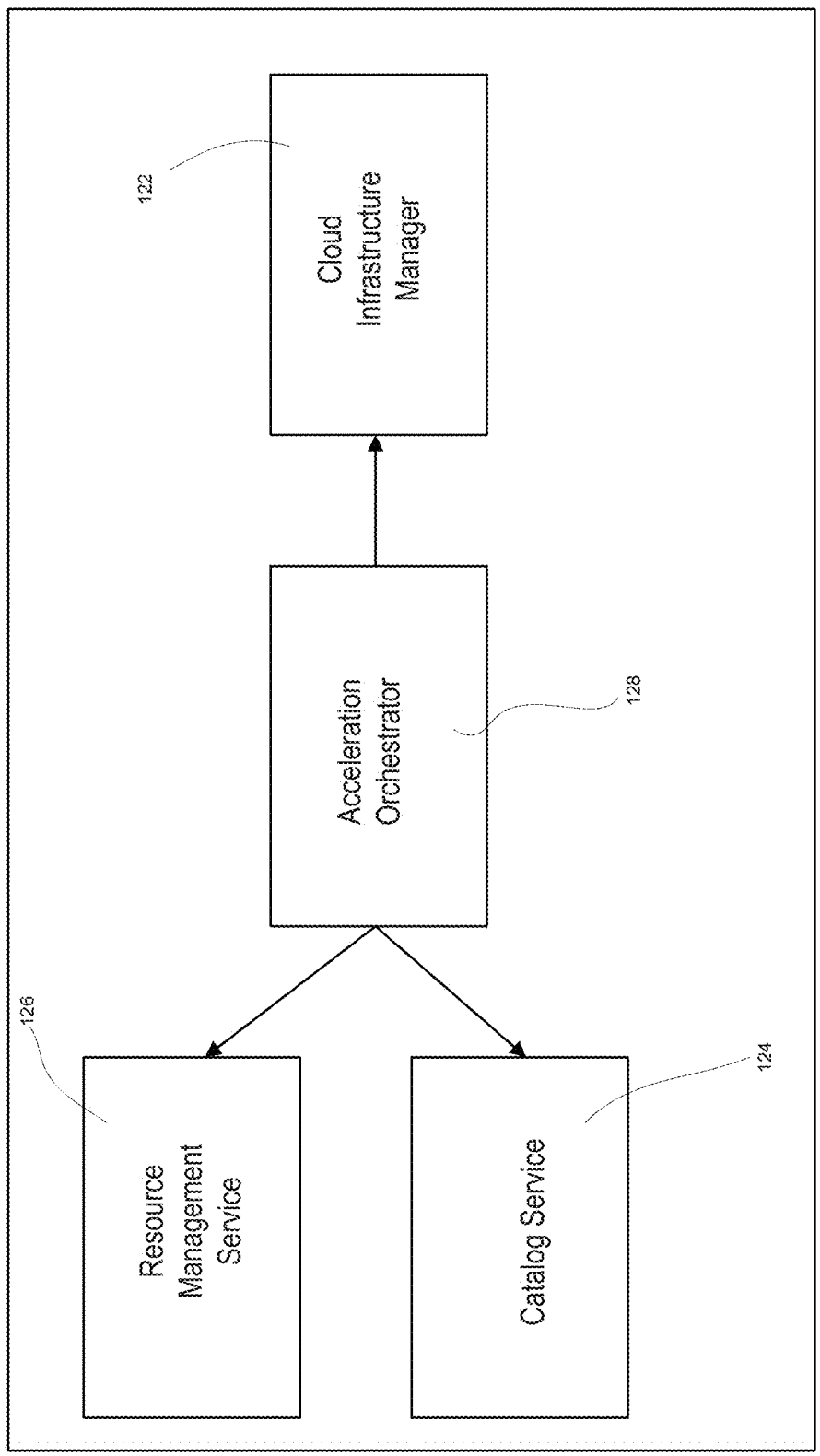
FIG. 4 is a block diagram of components of a master server of the system of FIG. 1.

FIG. 4 depicts components at master server 102. As depicted, master server 102 comprises a cloud infrastructure manager 122, a catalog service 124, a resource management service (RMS) 126, and an acceleration orchestrator 128.

Cloud infrastructure manager 122 provides components for controlling pools of computing resources within computing system 100, and in some embodiments can be implemented as a software platform. Specifically, cloud infrastructure manager 122 communicates with available resources within computing system 100 to determine the availability of resources for execution of workloads, e.g. deployment of applications and to provision resources for the performance of workloads. Cloud infrastructure manager 122 further communicates with client computing devices 106 to receive requests to perform workloads.

Workloads can be sent from client computing devices to cloud infrastructure 122 in the form of instruction messages requesting deployment or execution of applications. As will be described in further detail below, each instruction message may include a set of parameters, referred to as a policy, defining requirements and preferences for execution of the workload. For example, a policy may define a particular type of accelerated function with which an application is to be executed.

RMS 126 maintains a data structure containing meta data of types of computing resources within system 100. Computing resources may include general purpose processors such as x86 processors and accelerators, such as ASICs, DSPs or FPGAs. Thus, RMS 126 can identify the types of processors and accelerators available for processing workloads in computing system 100. In some embodiments, RMS 126 further maintains a data structure containing availability information for processing resources at servers 102. That is, RMS 126 may maintain records indicating whether each processing resource is available for execution of workloads. Such records may be updated, e.g., based on periodic or event-based polling of servers 102 or based on notification messages pushed from servers 102 to RMS 126.

Catalog service 124 maintains a data structure containing instructions for implementation of accelerated functions. Some types of accelerators, such as FPGAs, have reconfigurable architectures. That is, an FPGA can be configured to implement a particular accelerated function. Instructions for such configurations may be referred to as programming files. Some other types of accelerators, such as ASICs and DSPs, cannot be reconfigured and therefore inherently implement a particular accelerated function under control of a compiled binary. For example, for each type of FPGA present in the data structure of RMS 126, catalog service 124 contains one or more programming files, each for configuring the FPGA to perform a particular type of accelerated function. For each ASIC or DSP, catalog service 124 maintains a compiled binary upon which the ASIC or DSP relies. In some embodiments, catalog service 124 can include instructions for the implementation of the functions on both accelerated and general purpose processors. Thus catalog service 124 may have a plurality of software implementations (or may point to a location at which the implementations may be found) for each function provided by computing system 100, each of the plurality of implementations of a given function being associated with an accelerator or processor type in the computing system 100.

Figure 5:
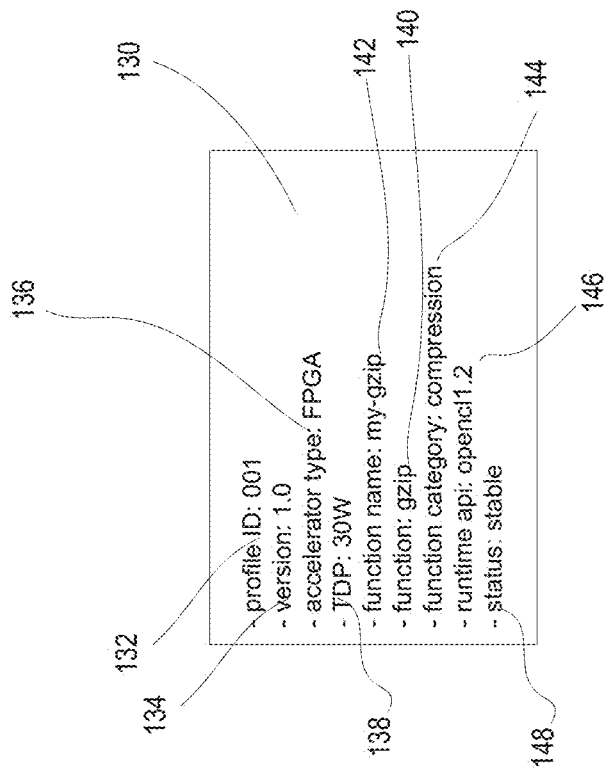
FIG. 5 is a schematic diagram of a data structure representing hardware accelerator configurations.

FIG. 5 depicts an example record 130 of a data structure maintained by catalog service 126. Record 130 is for an FPGA configured to perform an accelerated implementation of the gzip compression function. The record includes an ID field 132; version identifier field 134; an accelerator type field 136; a power consumption field 138; a function field 140; a function name field 142; a function category field 144; one or more artifact fields 146; and status field 148.

ID field 132 contains a unique value associated with and identifying a particular processor 110, accelerated processor 111 or GPU 119 targeted by the accelerated function. Version field 134 contains version (e.g. revision level) of the function implementation. Accelerator type field 136 identifies the target processor or accelerator type, e.g. FPGA, ASIC, or DSP. Function field 140 contains an identifier of the function being accelerated. Function name field 142 contains a name assigned to the accelerated function, e.g. by the function developer, commonly referred to as an IP developer. Function category field 144 contains a definition of a category to which the function belongs.

Artifact fields 146 identify complementary components for executing the accelerated functions on specific hardware platforms. Artifact fields 146 may include application programming interfaces (APIs); compiled bitstreams or binaries; run-time libraries; firmware or the like. Artifact field 146 of record 130 indicates that the FPGA identified in ID field 132, as configured, is compatible with the Open Computing Language OpenCL1.2 API, which provides a framework for function execution across heterogeneous computing environments.

Status field 148 contains a value specifying the development status of the accelerated function, e.g. experimental or stable. It should be understood that not all of the entries described above are required in each implementation of the data structure. It should be understood that in many implementations, the structure of each record in the catalog will be the same.

In one embodiment, the data structure maintained by catalog 124 contains a record 130 for each accelerated function available within computing system 100, i.e. for each accelerated function available to be run on the various types of accelerators and general purpose processors in resource servers 104.

Resource management service (RMS) 126 maintains information about specific instances of resources within computing system 100. That is, RMS 126 maintains records of the number, availability and utilization/load of resources.

FIG. 6 depicts example records of a data structure 160 maintained by resource management service 126. Data structure 160 contains records for each processing resource (processor 110, accelerated processor 111, GPU 119) in each resource server 104 within computing system 100. As shown, each record has a resource ID field 162 with a value uniquely identifying the specific resource, i.e. the specific resource server 104 or processing resource therein. Each record further contains an accelerator profile field 164 with a value corresponding to a profile ID 132 of data structure 130; a performance field 170; a power consumption field 172; a development status field 174; and a resource availability field 176.

Performance field 170 contains a metric of the resource's performance. The metric may be a throughput, e.g. 3 Gbps. Other metrics may be used.

Power consumption field 172 contains a value indicative of the amount of power used by the resource when under load. The power consumption may be a design rating, such as a thermal rating, or a measured consumption value.

Availability field 176 contains values indicating the availability of the resource for new workloads. In the depicted embodiment, the values in availability field 178 are binary. That is, resources have either an availability of 1, indicating that the resource is idle and available for a new workload; or an availability of 0, indicating that the resource is busy with an existing workload. In other embodiments, availability field 178 may also reflect the degree of utilization of resources. For example, the availability may be expressed as a percentage, with 100% indicating that the resource is fully idle and ready for a new workload, and 0% indicating that the resource is fully utilized in execution of an existing workload. It should be understood that not all embodiments require all the fields of the data structure 160, and that in some embodiments only a subset of these fields is required. In some embodiments additional fields may be present in the data structure.

Referring to FIG. 4, acceleration resources orchestrator (ARO) 128 can communicate with resource management service 126 and catalog service 124. ARO 128 therefore has access to data in both data structure 130 maintained by catalog service 124 and data structure 160 resource management service 126.

ARO 128 further communicates with cloud infrastructure manager 122, from which ARO 128 receives data regarding demands for resources in system 100. Specifically, cloud infrastructure manager 122 receives requests for deployment or execution of applications from client devices 106 and provides messages to ARO 128 defining functions to be executed, along with associated policies defining computational requirements and preferences.

Based on the resource availability information received from RMS 126 and catalog 124, and the resource request information received from cloud infrastructure manager 122, ARO 128 analyzes function requirements and resource availability, then allocates types and quantities of resources to particular requests. Specifically, ARO 128 is configured to filter available resources based on parameters associated with the requests, rank the candidate resources, and match resources to workloads. ARO 128 is further configured to construct a provisioning request and send the provisioning request to cloud infrastructure manager 122 for provisioning of resources.

As noted above, requests for provisioning of resources may originate from client computing devices 106. Each request defines a workload to be executed and is accompanied by a policy defining requirements or preferences for the execution of the workload.

FIG. 7 depicts an example policy 180 sent from a client computing device 106 to cloud infrastructure manager 122 of master server 102. Policy 180 defines a function category 182; a function type 184; a performance metric 186 and performance unit 188; a performance requirement 192; a power threshold 194; a stability requirement 196; and an acceleration requirement flag 198. Other fields are possible. Moreover, some of the above-mentioned fields may be omitted in some embodiments.

Function category 182 and function type 184 correspond to function category 144 and function 142 of records 130 (FIG. 5). In the depicted example, policy 180 is for a compression function. In some examples, multiple functions may be specified. Thus, as shown, function type 184 may be an array specifying multiple types of functions with which the application is compatible. In the depicted example, function type 184 indicates that either gzip or snappy functions can be used.

The performance metric 186, performance unit 188 and performance requirement 192 define the performance characteristics required by the function. Likewise, power threshold 194 defines a maximum acceptable power consumption rating for a resource used to execute the function.

Stability requirement 196 indicates whether the function can be executed using resources designated as "experimental". In a computing system 100 without experimental implementations, this field could be omitted.

Acceleration requirement flag 198 indicates whether the acceleration parameters defined in policy 180 are "hard" or "soft". If the requirements are soft, the function can be executed on either a general-purpose processor, with the function implemented in software, or a hardware-accelerated processor. If requirements are hard, execution on an accelerated processor is mandatory. In some implementations, the acceleration requirement may be specified by a minimum performance metric in place of a flag. This would indicate that any implementation capable of meeting the requirement could be employed.

Policy 180 further includes a set of rules 200 to selectively rank candidate resources for deployment of the function. Rules 200 each define a criterion for sorting the available resources. The example policy 180 has three rules 200-1, 200-2 and 200-3, specifying that the available resources are to be sorted in descending order of performance; in ascending order of thermal design power (TDP); and in ascending order of function type. Rules 200-1, 200-2, 200-3 are applied in order, i.e. resources are to be sorted first according to performance, second according to TDP, and third according to the available function.

Figure 8:
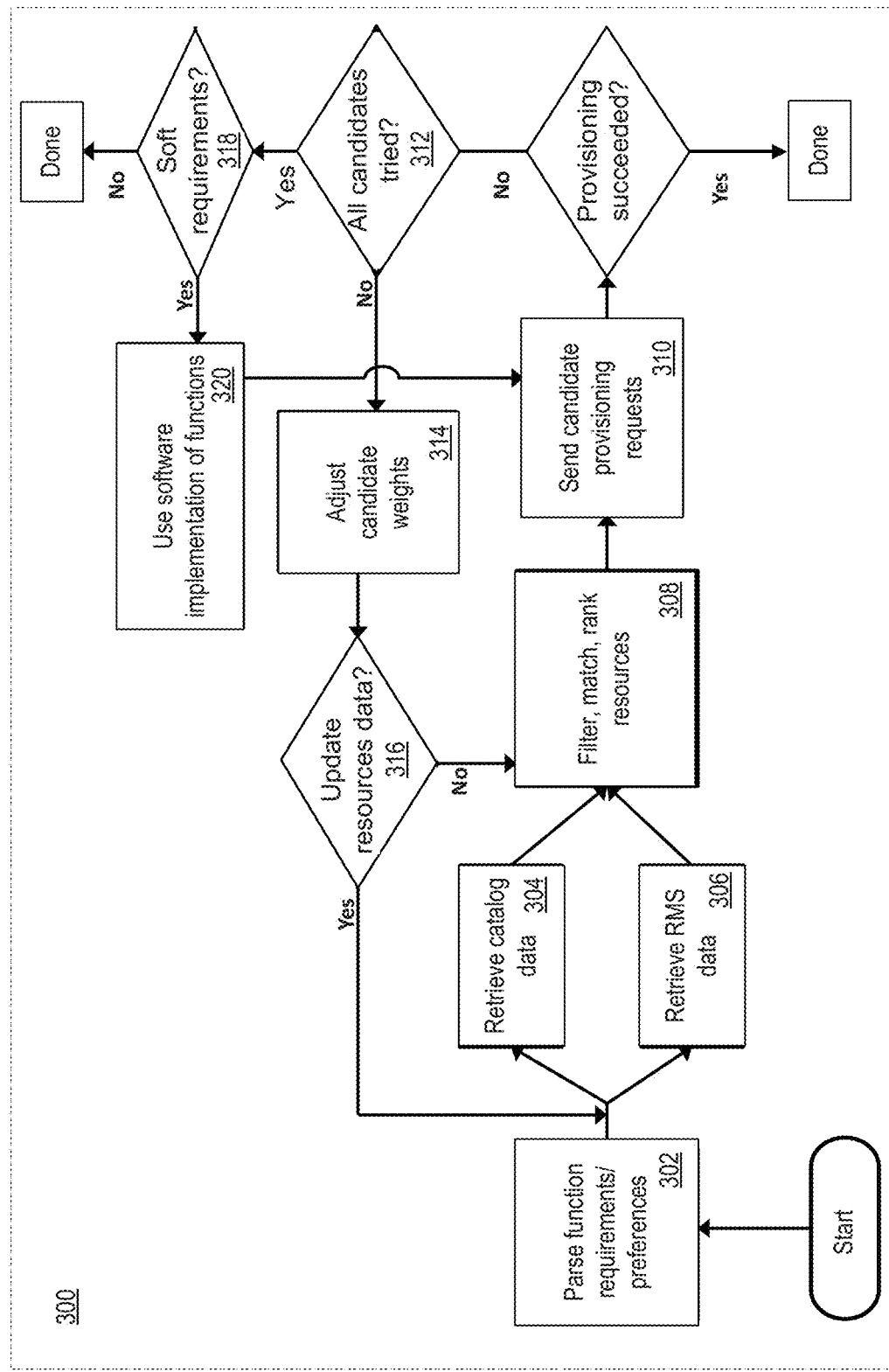
FIG. 8 is a flow chart showing a process of provisioning resources for execution of a workload.

FIG. 8 depicts a process 300 carried out by ARO 128 to allocate acceleration resources to workload requests.

At block 302, master server 102 receives a request to deploy a function, and a policy defining acceleration requirements or preferences for the function. The request and policy are passed to ARO 128. As discussed above and shown in FIG. 6, the policy 180 may identify a type of function, rather than a specific hardware implementation. Accordingly, ARO 128 parses the policy and generates corresponding queries. Specifically, ARO 128 constructs a first query for identifying function implementations suitable for executing the requested workload; and a second query for identifying available accelerators for executing the requested workload.

The first query is a request for all function implementations with function type field 144 matching the function type 184 from policy 180. At block 304, the first query is passed to catalog service 124, which returns a message including records of data structure 130 corresponding to any suitable function implementations. FIG. 9A depicts an example table 204 of candidate accelerated functions returned by catalog service 124. As depicted, table 204 includes six records 204-1 through 204-6. However, any number of records may be present.

The second query is a request for all available accelerators within computing system 100. At block 306, the second query is passed to RMS 126, which returns a message to ARO 128 identifying the available accelerators. Accelerators identified in the return message are referred to herein as candidate accelerators.

At block 308, ARO 128 filters the candidate accelerators and function implementations. Specifically, ARO 128 retains candidate accelerators and function implementations that match one another and eliminates unmatched accelerators and function implementations. As used herein, "matching" accelerators and function implementations are those corresponding accelerators and function implementations that are compatible with the same accelerator profile. ARO 128 further eliminates any accelerators and function implementations that do not satisfy the requirements defined in policy 180. ARO 128 ranks the matching accelerators and function implementations according to rules 200 of policy 180.

FIG. 9B depicts an example table 204' obtained by filtering and ranking table 204 (FIG. 9A) based on rules 200-1, 200-2, 200-3 shown in FIG. 7. As shown in FIG. 7, policy 180 defines a maximum TDP of 50 W and a required development status of "stable". Accordingly, record 204-2, with development status of "experimental" and record 204-5, with TDP of 100 W, are eliminated in table 204'. Rules 200-1, 200-2, 200-3 define a first sorting order of descending performance; a second sorting order of ascending TDP and a third sorting order of function type. Accordingly, the remaining records 204-1, 204-3, 204-4 and 204-6 are listed in descending order of performance and with record 204-3 ranked ahead of record 204-1, based on the lower TDP of record 204-3.

In some embodiments, ranking may be based on a weighting formula. Specifically, weights may be assigned to the candidates based on ranking rules 200 in policy 180. Additional weights may be assigned on other criteria. For example, weights may be assigned based on the number of instances of a particular accelerator that are present and available for use. Weights may also be assigned based on the load of a resource server 104 in which a particular accelerator is present. That is, an accelerator in an idle server may be weighted heavily, while an accelerator in a relatively busy server may be given relatively less weight. Such weighting strategies are intended to favour accelerators that are readily available.

Other algorithms for filtering, ranking and weighting candidate accelerators are possible.

Referring again to FIG. 8, at block 310, ARO 128 sends a message to Cloud infrastructure manager 122 requesting provisioning of resources. The provisioning request message includes values from the top-ranked row of table 204', defining the characteristics of the top-ranked accelerator and accelerated function combination. RMS 126 attempts to match a specific available accelerator having the defined characteristics.

If RMS 126 successfully finds an available accelerator having the requested characteristics, that accelerator is assigned to the workload being provisioned, and the provisioning process concludes.

If RMS 126 does not successfully find an available accelerator having the requested characteristics, a failure message is returned to ARO 128. Provisioning by RMS 126 may fail, for example, if the availability of one or more accelerators changes after querying at blocks 304, 306 and before provisioning at block 310.

Upon receipt of a failed provisioning message, at block 312, ARO 128 checks whether provisioning has been attempted for all candidates accelerators. If not, ARO 128 re-weights the candidates at block 314. For example, if provisioning fails because a previously-available accelerator becomes busy, weighting of candidates may be adjusted to favour accelerators of which multiple instances are present and available. Optionally, at block 316, ARO 128 may determine whether to refresh accelerator candidate data. The decision may be based, for example, on an elapsed time since the last queries at blocks 304, 306, or on a number of candidate accelerators for which provisioning has been unsuccessfully attempted. If the candidate data is to be refreshed, the process returns to blocks 304, 306 and ARO 128 queries catalog 124, RMS 126. If not, the process returns to block 308 to re-filter, match and rank candidates based on the revised weightings.

If, at block 312, ARO 128 determines that provisioning failed for all accelerator candidates, the process moves to block 318. ARO 128 determines based on policy 128 if the accelerator requirements defined in policy 180 are hard requirements. If so, the process ends without successful provisioning. However, if the accelerator requirements are "soft", at block 320, ARO 128 attempts to provision resources for software-implemented execution of the workload. ARO 128 generates a provisioning request for general purpose processors and sends the request to RMS 126, which attempts provisioning based on the new request. If the requirements in policy 180 are "hard" requirements, or if provisioning using general purpose processors fails, the provisioning request terminates and an error message is returned.

If provisioning succeeds, master server 102 sends an instruction for deploying the application to the resource server 104 hosting the provisioned computing resource.

Figure 10:
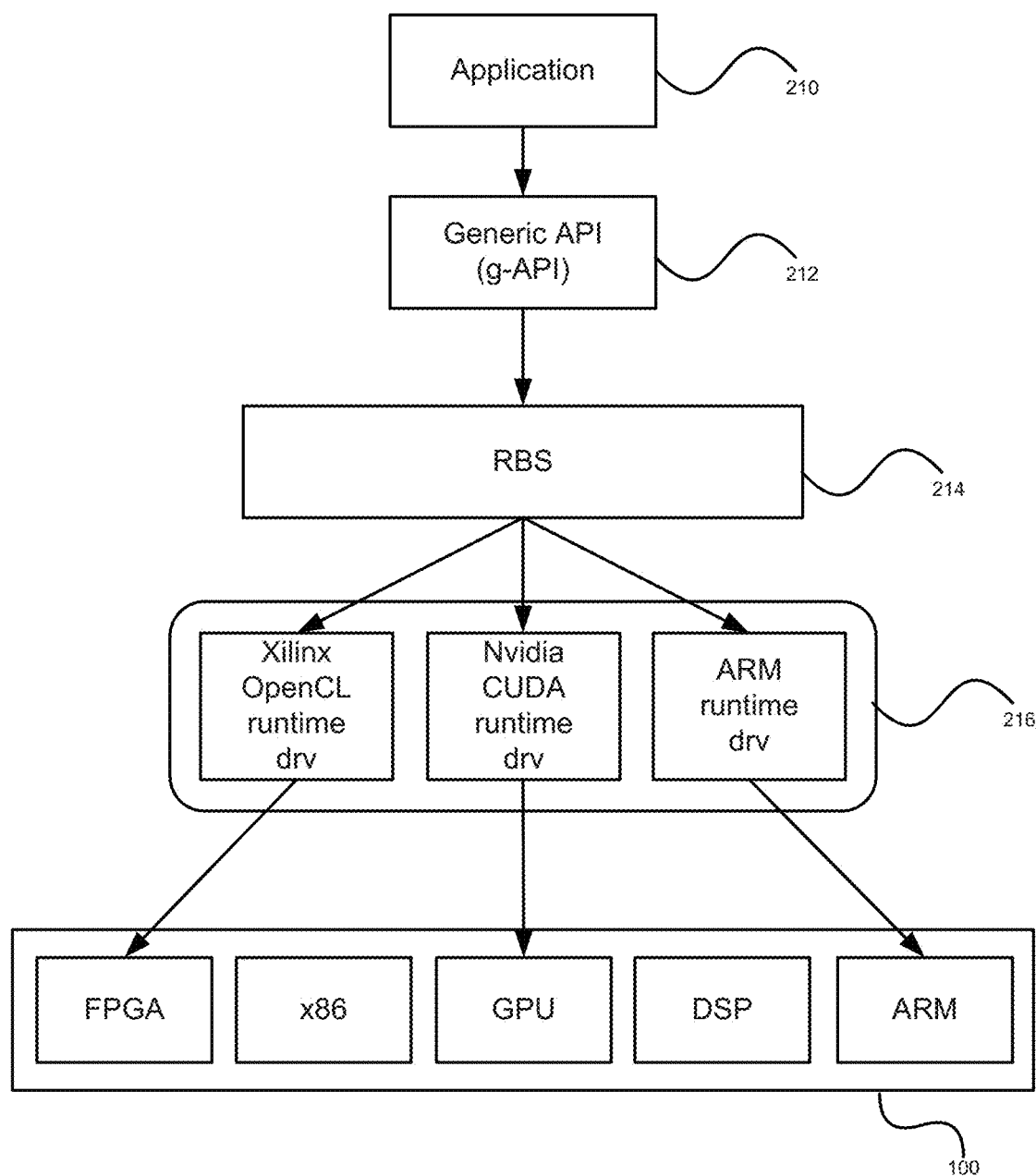
FIG. 10 is a block diagram of software components at a resource server of the system of FIG. 1.

FIG. 10 depicts software components at resource server 104 configured to allow flexible execution of functions written for a variety of resource types. After a particular resource server is provisioned to perform a workload, the workload is deployed as an instance of application software 210 at the resource server 104. Resource server 104 further includes one or more APIs referred to as a generic APIs or g-APIs 212. For simplicity, a single g-API 212 is shown in FIG. 10, but any number of g-APIs may be present.

Each g-API 212 exposes at least one function to be invoked by application software 123. In an example, a first g-API 212 may expose a set of compression functions and a second g-API may expose a set of encryption functions. As used herein, exposing functions by an API refers to providing functions for use by application software 210, which can be invoked by calls to the API.

g-APIs 212 are configured to receive function calls from application software 210 and to send the function calls to a binding service for execution on using a specific processor type. When application software 210 calls a function provided by a g-API 212, the g-API 212 constructs an instruction message. The instruction message includes a placeholder for the called function. The placeholder identifies the function to be executed, but does not identify or rely on any platform-specific or IP-specific components such as binaries or the like. Rather, the placeholder serves to identify the called function so that the function can be bound to an appropriate platform-specific binary at runtime. For example, a particular compression function may have implementations for a variety of platforms, including a general purpose processor and an accelerator. When the compression function is called by way of g-API 212, the g-API 212 constructs a message with a placeholder identifying the compression function, but without specifying a platform on which the compression function is to be executed or including any platform-specific components.

Binding is performed by a runtime binding service (RBS) 214 at each resource server 104.

As depicted, RBS 214 at each resource server 104 relies on driver libraries 216 to construct platform-specific commands for the processor 110, accelerated processor 111 or GPU 119 at that resource server 104. Example driver libraries may include Xilinx OpenCL runtime drivers for various FPGA-implemented functions; Nvidia CUDA runtime drivers for GPUs; and ARM runtime drivers for processors employing the ARM instruction set. Other driver libraries may be present, as will be apparent. FIG. 10 depicts multiple sets of libraries and multiple processor types. However, RBS 214 at any given resource server may rely on only a single library, for a single type of processor 110, accelerated processor 111 or GPU 119.

Once a resource is provisioned for a particular workload, and the workload deployed at a resource server 104, function calls are made by way of g-API 212. RBS 214 receives placeholder function calls from g-API 212, parses the placeholder function calls constructs the corresponding function call specific to the provisioned resource. For example, in a resource server 104 hosting a processor with a particular FPGA IP, RBS 214 replaces the placeholder function with an equivalent call for that FPGA IP. The platform-specific function call is then executed.

Thus, construction of platform-specific instructions is handled by g-APIs 212 and RBS 214. Therefore, by developing application software to rely on g-APIs 212, software developers can standardize applications for execution on multiple platforms. That is, developers can create hardware-agnostic code, i.e. a single code base capable of execution on multiple platforms, rather than multiple versions designed for different platforms. The cost and effort of software development may therefore be reduced, as development resources can be focused on application logic, interface and the like, rather than on supporting multiple accelerators.

Accordingly, the platform on which functions are to be deployed need not be selected before runtime. This may promote efficient use of resources in distributed computing system 100. In particular, dynamic matching of accelerators to functions allows for high-performance, accelerated implementations to be used when available, while maintaining flexibility associated with general purpose processors.

As will be apparent, the above-described provisioning process is capable of flexibly assigning workloads to be performed by accelerators of one or more types, or by general purpose processors. Client computing devices 106, as well as software and functions at client computing devices 106, resource servers 104 and master server 102 may likewise be configured so that functions can be flexibly executed by either accelerators or general purpose processors. Such configuration may allow applications to take advantage of the improved performance of accelerators, when available, and still rely on the flexibility of general purpose processors.

It should be understood that various changes, substitutions and alterations can be made to the detailed examples described herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the detailed embodiments described above and illustrated are intended to be examples only. The invention is defined by the appended claims.

What is claimed is:

1. A method of provisioning resources in a distributed computing system, the method comprising:
   receiving a request from a client device for execution of a function and a policy associated with the function, the policy comprising a function type of the function and a performance requirement of the function;
   retrieving, first records of a first data structure relating implementations of said function and compatible types of processors for each of said implementations based on the function type of the function in the policy, each of the first records comprising the function type, a processor type compatible with the function, and information about a function implementation for the processor type;
   retrieving, second records of a second data structure, each of the second records identifying an available processor of multiple types of processors in said distributed computing system and performance information of the available processor;
   identifying candidate processors from available processors based on the first records, the second records including the performance information of the available processors, and the policy including the performance requirement of the function;
   receiving at least one execution parameter defining preferences for hardware acceleration;
   ranking said candidate processors based on said at least one execution parameter and selecting one of said candidate processors based on the ranking, wherein said ranking comprises assigning weights to said candidate processors;
   transmitting a provisioning instruction for allocating a selected one of said candidate processors for execution of said function
   receiving a provisioning failure notification;
   revising said ranking by changing said weights; and
   transmitting a second provisioning instruction for allocating another selected one of said candidate processors for execution of said function, wherein said another selected one of said candidate processors is selected from the revised ranking.

2. The method of claim 1, wherein said ranking comprises filtering said candidate processors based on said at least one execution parameter.

3. The method of claim 1, further comprising:
   in response to said receiving the provisioning failure notification, retrieving at least one data structure to update said candidate processors.

4. The method of claim 1, further comprising:
   in response to receiving the provisioning failure notification, generating the second provisioning instruction for allocating a general-purpose processor for execution of said function.

5. The method of claim 1, wherein said multiple types of processors include a field-programmable gate array and a general purpose processor.

6. The method of claim 5, wherein said implementations of said function comprise hardware-accelerated implementations compatible with said multiple types of processors.

7. The method of claim 6, wherein said implementations of said function further comprise software implementations for execution on a general-purpose processor.

8. A server of a distributed computing system, the server comprising:
   a catalog module configured to maintain a first data structure relating to function implementations and compatible types of processors for said function implementations;
   a resource management module configured to provide a second data structure identifying available processors of multiple types of processors in said distributed computing system;
   a resource orchestrator module configured to:
      receive a request from a client device for execution of a function and a policy associated with the function, the policy comprising a function type of the function and a performance requirement of the function;
      retrieve, first records from said first data structure, based on the function type of the function in the policy, each of the first records comprising the function type, a processor type compatible with the function, and information about a function implementation for the processor type;
      retrieve, second records of said second data structure, each of the second records identifying an available processor of the available processors and performance information of the available processor;
      identify candidate processors from the available processors based on the first records, the second records including the performance information of the available processors, and the policy including the performance requirement of the function;
      receive at least one execution parameter defining preferences for hardware acceleration;
      rank said identified candidate processors based on said at least one execution parameter and select one of said candidate processors based on the ranking, wherein ranking of said identified candidate processors comprises assigning weights to said candidate processors;
      transmit a provisioning instruction for allocating a selected one of said candidate processors for execution of said function;
      receive a provisioning failure notification;
      revise said ranking by changing said weights; and
      transmit a second provisioning instruction for allocating another selected one of said candidate processors for execution of said function, wherein said another selected one of said candidate processors is selected from the revised ranking.

9. The server of claim 8, wherein said resource orchestrator module is configured to filter said candidate processors based on said at least one execution parameter.

10. The server of claim 8, wherein said server is configured to generate the second provisioning instruction for allocating a general-purpose processor for execution of said function in response to the provisioning failure notification.

11. The server of claim 8, wherein said candidate processors include a field-programmable gate array and a general purpose processor.

12. The server of claim 8, wherein said function implementations comprise hardware-accelerated implementations compatible with said multiple types of processors.

13. The server of claim 12, wherein said function implementations further comprise software implementations for execution on general-purpose processors.

14. A distributed computing system comprising:
a plurality of resource servers having a plurality of types of processors;
a master server in communication with said resource servers, said master server comprising:
a catalog module configured to maintain a first data structure relating to function implementations and compatible types of processors for said function implementations;
a resource management module configured to provide a second data structure identifying available processors of multiple types of processors in said distributed computing system;
a resource orchestrator module configured to:
receive a request from a client device for execution of a function and a policy associated with the function, the policy comprising a function type of the function and a performance requirement of the function;
retrieve, first records of the first data structure based on the function type of the function in the policy, each of the first records comprising the function type, a processor type compatible with the function, and information a function implementation for the processor type;
retrieve, second records of the second data structure, each of the second records identifying an available processor of the available processors and performance information of the available processors;
identify candidate processors from the available processors based on the first records, the second records including the performance information of the available processors, and the policy including the performance requirement of the function;
receive at least one execution parameter defining preferences for hardware acceleration;
rank said identified candidate processors based on said at least one execution parameter and select one of said candidate processors based on the ranking, wherein ranking of said identified candidate processors comprises assigning weights to said candidate processors;
transmit a provisioning instruction for allocating a selected one of said candidate processors for execution of said function;
receive a provisioning failure notification;
revise said ranking by changing said weights; and
transmit a second provisioning instruction for allocating another selected one of said candidate processors for execution of said function, wherein said another selected one of said candidate processors is selected from the revised ranking.

15. The system of claim 14, wherein said plurality of types of processors includes field-programmable gate arrays and general-purpose processors.

16. The system of claim 14, further comprising a plurality of resource servers hosting different types of processors, each of said resource servers having a program interface configured to receive generic function calls from application software and a binding service to replace said generic function calls with commands for execution on a processor hosted at the each of said resource servers.

17. The method of claim 1, the identifying comprising:
matching the first records and the second records to generate a subset of the available processors; and
identifying the candidate processors by eliminating processors from the subset of the available processors based on the performance requirement of the function in the policy and based on the performance information of the available processors.

\* \* \* \* \*